US012734107B2

(12) United States Patent
Jeong et al.

(10) Patent No.: US 12,734,107 B2
(45) Date of Patent: Sep. 15, 2026

(54) MASSAGE APPARATUS

(71) Applicant: SAMSUNG ELECTRONICS CO., LTD., Suwon-si (KR)

(72) Inventors: Jiho Jeong, Suwon-si (KR); Daesung Ki, Suwon-si (KR); Taeseob Lim, Suwon-si (KR); Kunwoo Baek, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 649 days.

(21) Appl. No.: 18/199,181

(22) Filed: May 18, 2023

(65) Prior Publication Data

US 2024/0033174 A1 Feb. 1, 2024

Related U.S. Application Data

(63) Continuation of application No. PCT/KR2023/005257, filed on Apr. 19, 2023.

(30) Foreign Application Priority Data

Jul. 28, 2022 (KR) ........................ 10-2022-0094249

(51) Int. Cl.
*A61H 23/02* (2006.01)

(52) U.S. Cl.
CPC ..... *A61H 23/02* (2013.01); *A61H 2201/0149* (2013.01)

(58) Field of Classification Search
CPC ........ A61H 15/0078; A61H 2015/0042; A61H 23/02; A61H 23/0218; A61H 2201/0138;
(Continued)

(56) References Cited

U.S. PATENT DOCUMENTS

2004/0122343 A1* 6/2004 Mori .................. A61H 15/0078 601/102
2004/0171972 A1* 9/2004 Shimizu ................. A61H 7/007 601/102
(Continued)

FOREIGN PATENT DOCUMENTS

CN 201108570 Y 9/2008
CN 108652931 A 10/2018
(Continued)

OTHER PUBLICATIONS

International Search Report dated Aug. 18, 2023 for International Application No. PCT/KR2023/005257.
(Continued)

*Primary Examiner* — Douglas Y Sul
(74) *Attorney, Agent, or Firm* — STAAS & HALSEY LLP

(57) ABSTRACT

A massage apparatus including a base frame; a seat frame coupled to the base frame to form a seating surface; and a massage module disposed at a rear of the seating surface to be movable between the base frame and the seat frame, wherein the massage module includes a module base, a side frame coupled to the module base to be rotatable in forward and backward directions, a driving shaft disposed to pass through the side frame and rotate inside of the side frame, a bracket unit connected to the driving shaft and configured to be movable according to rotation of the driving shaft, and a massage ball unit including an electromagnet and a massage ball, the massage ball unit coupled to the bracket unit to advance and retreat based on movement of the bracket unit, and the massage ball being movable by the electromagnet.

12 Claims, 10 Drawing Sheets

(58) Field of Classification Search
CPC .... A61H 2201/0142; A61H 2201/0146; A61H 2201/0149; A61H 2201/5002
See application file for complete search history.

(56) References Cited

U.S. PATENT DOCUMENTS

| | | | | |
|---|---|---|---|---|
| 2007/0167887 | A1* | 7/2007 | Tsukada | A61H 15/0078 601/99 |
| 2013/0253390 | A1* | 9/2013 | Park | A61H 15/02 601/99 |
| 2015/0157528 | A1* | 6/2015 | Le | A61H 23/006 601/99 |
| 2017/0079865 | A1* | 3/2017 | Kao | A61H 1/008 |
| 2017/0156975 | A1 | 6/2017 | Mills | |
| 2017/0360641 | A1* | 12/2017 | Nakata | A61H 7/007 |
| 2020/0016027 | A1* | 1/2020 | Kim | G06N 3/0464 |
| 2022/0241135 | A1* | 8/2022 | Wang | A61H 23/006 |
| 2022/0362098 | A1* | 11/2022 | Ju | A61H 7/007 |
| 2022/0370288 | A1* | 11/2022 | Ju | A61H 7/007 |
| 2022/0378651 | A1* | 12/2022 | Palacio | A61H 23/0218 |

FOREIGN PATENT DOCUMENTS

| | | | |
|---|---|---|---|
| CN | 108721087 | A | 11/2018 |
| CN | 109011165 | A | 12/2018 |
| JP | 4-240449 | A | 8/1992 |
| JP | 2002-272799 | A | 9/2002 |
| JP | 2003-116950 | A | 4/2003 |
| JP | 2011-156015 | A | 8/2011 |
| KR | 20-0246877 | Y1 | 10/2001 |
| KR | 20-0309582 | Y1 | 4/2003 |
| KR | 10-2004-0075391 | A | 8/2004 |
| KR | 10-2005-0121834 | A | 12/2005 |
| KR | 10-2008-0001082 | A | 1/2008 |
| KR | 10-0978414 | B1 | 8/2010 |
| KR | 20-2010-0008858 | U | 9/2010 |
| KR | 20-0454691 | Y1 | 7/2011 |
| KR | 20-0474149 | Y1 | 8/2014 |
| KR | 10-2016-0064868 | A | 6/2016 |
| KR | 20-2018-0002629 | U | 9/2018 |
| KR | 10-2020-0048768 | A | 5/2020 |
| KR | 10-2022-0040845 | A | 3/2022 |

OTHER PUBLICATIONS

Written Opinion of the International Searching Authority dated Aug. 18, 2023 for International Application No. PCT/KR2023/005257.

* cited by examiner

MASSAGE APPARATUS

CROSS-REFERENCE TO RELATED APPLICATIONS

This application is a continuation application of international Application No. PCT/KR2023/005257, filed on Apr. 19, 2023, and claims priority to Korean Patent Application No. 10-2022-0094249, filed on Jul. 28, 2022, the disclosures of which are incorporated by reference herein in their entireties.

BACKGROUND

1. Field

The present disclosure relates to an improved structure of a massage apparatus.

2. Description of the Related Art

A massage apparatus is an apparatus that allows a user to receive a massage while being seated, and provides a massage over all areas of the user's body.

Typically, massage apparatuses may be provided as a chair-type structure massage apparatus or a bed-type structure massage apparatus.

Inside a massage apparatus, a massage module for providing a user with a massage may be disposed. The massage module performs a massage by applying an appropriate shock to the user's body through rotation and reciprocation motions.

However, during operation of the massage module, a motor power is transmitted through a gear, which may cause operating noise to occur and have a difficulty in subdividing and controlling the massage intensity.

SUMMARY

Aspects of embodiments of the disclosure will be set forth in part in the description which follows and, in part, will be apparent from the description, or may be learned by practice of the presented embodiments.

According to an embodiment of the disclosure, a massage apparatus may include a base frame; a seat frame coupled to the base frame to form a seating surface; and a massage module disposed at a rear of the seating surface to be movable between the base frame and the seat frame.

According to an embodiment of the disclosure, the massage module may include a module base, a side frame coupled to the module base to be rotatable in forward and backward directions, a driving shaft disposed to pass through the side frame and rotate inside of the side frame, and a bracket unit connected to the driving shaft and configured to be movable according to rotation of the driving shaft, According to an embodiment of the disclosure the massage module may further include a massage ball unit including an electromagnet and a massage ball, the massage ball unit coupled to the bracket unit to advance and retreat based on movement of the bracket unit, and the massage ball being movable by the electromagnet.

According to an embodiment of the disclosure, the massage apparatus further includes a controller configured to control an amount of current supplied to the electromagnet of the massage ball unit.

According to an embodiment of the disclosure, the bracket unit includes a fixing bracket fixed in position with respect to the side frame, and configured so that the driving shaft passes through the fixing bracket, and a connecting bracket configured to be movable with respect to the fixing bracket based on an eccentric rotation of the driving shaft.

According to an embodiment of the disclosure, the massage ball unit includes a case mounted on the connecting bracket and including a coil portion forming the electromagnet, the massage ball being configured to advance and retreat with respect to the case by a magnetic field induced from the coil portion.

According to an embodiment of the disclosure, the connecting bracket includes an upper mounting portion, and a lower mounting portion disposed below the upper mounting portion.

According to an embodiment of the disclosure, the massage ball unit includes a first massage ball unit mounted on the upper mounting portion; and a second massage ball unit mounted on the lower mounting part.

According to an embodiment of the disclosure, the controller is configured to individually control amounts of current supplied to the first massage ball unit and the second massage ball unit so that the massage ball of the first massage ball unit and the massage ball of the second massage ball unit move at different velocities.

According to an embodiment of the disclosure, the massage apparatus further includes a controller configured to control driving of the massage module; and a driver configured to provide power for moving the bracket unit, wherein the controller controls the massage module so that only the massage ball unit is driven, and prevents the driver from being driven, to perform a low-noise massage mode.

According to an embodiment of the disclosure, the controller is configured to control an amount of current supplied to the massage ball unit so that the massage ball of the massage ball unit moves at a first velocity, to perform a low-noise pressing mode.

According to an embodiment of the disclosure, the controller is configured to control the amount of current supplied to the massage ball unit so that the massage ball of the massage ball unit moves at a second velocity that is higher than the first velocity, to perform a low-noise tapping mode.

According to an embodiment of the disclosure, the massage apparatus further includes a rotational driver configured to provide rotational power to the side frame, wherein the controller is configured to control the rotational driver to rotate the side frame so that a rear surface of a body of a user seated on the seating surface is in close contact with the massage ball unit, and control the amount of current supplied to the massage ball unit so that the massage ball of the massage ball unit moves at a third velocity that is higher than the first velocity and the second velocity, to perform a low-noise vibration mode.

According to an embodiment of the disclosure, the massage ball unit is configured to be movable forward and backward based on the seating surface.

According to an embodiment of the disclosure, the module base includes a guide pinion gear disposed on an outside of the module base, and a guide shaft connected to the guide pinion gear and passing through the module base, and the massage apparatus further includes a guide rail mounted on the base frame and having a guide rack gear engaged with the guide pinion gear to movably support each side of the module base.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
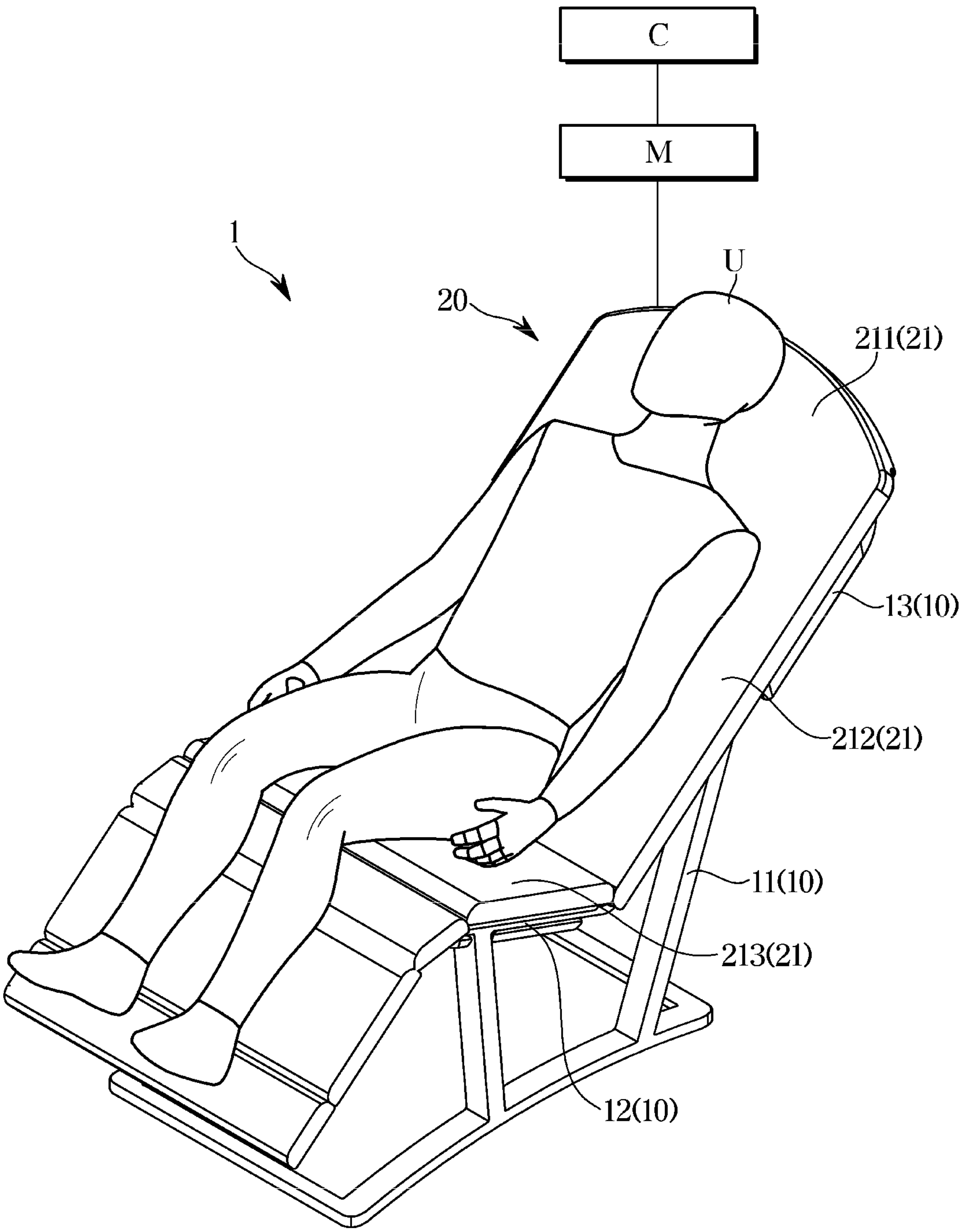
FIG. 1 is a perspective view illustrating a massage apparatus according to an embodiment of the disclosure.

Embodiments described in the specification and configurations shown in the accompanying drawings are merely exemplary examples of the present disclosure, and various modifications may replace the embodiments and the drawings of the present disclosure at the time of filing of the present application.

Further, identical symbols or numbers in the drawings of the present disclosure denote components or elements configured to perform substantially identical functions.

Further, terms used herein are only for the purpose of describing particular embodiments and are not intended to limit to the present disclosure. The singular form is intended to include the plural form as well, unless the context clearly indicates otherwise. It should be further understood that the terms “include,” “including,” “have,” and/or “having” specify the presence of stated features, integers, steps, operations, elements, components, and/or groups thereof, but do not preclude the presence or addition of one or more other features, integers, steps, operations, elements, components, and/or groups thereof.

Further, it should be understood that, although the terms “first,” “second,” etc., may be used herein to describe various elements, the elements are not limited by the terms, and the terms are only used to distinguish one element from another. For example, a first element could be termed a second element, and similarly, a second element could be termed a first element without departing from the scope of the present disclosure. The term “and/or” includes combinations of one or all of a plurality of associated listed items.

Various example embodiments of the disclosure provide a massage apparatus having a structure improved to reduce noise.

According to example embodiments, noise generated from a massage module may be reduced when providing a massage to a user, and thus the user’s satisfaction can be increased.

According to example embodiments, a massage ball unit using an electromagnet may be used, and thus the massage intensity of a massage module can be controlled in subdivided stages, and the massage intensity can be immediately adjusted.

According to example embodiments, the drive of a bracket unit may be combined with the drive of a massage ball unit, and thus more various massage modes can be provided to the user.

Hereinafter, embodiments according to the disclosure will be described in detail with reference to the accompanying drawings.

FIG. 1 is a perspective view illustrating a massage apparatus according to an embodiment.

Referring to FIG. 1, a massage apparatus 1 is an apparatus that provides a user U with a massage. The massage apparatus 1 may be implemented in the form of a chair in which a user U may take a rest while being seated or lying down.

The massage apparatus 1 may include a base frame 10 and a seat frame 20.

The seat frame 20 may be coupled to the base frame 10 to form a seating surface 21 on one side. For example, the seat frame 20 may be coupled to the front side of the base frame 10 such that the body of the user U is seated and supported thereon.

The seat frame 20 may be formed to extend longitudinally to support body parts of the user U from the head to the upper body, buttocks and lower body. In addition, the seat frame 20 is not limited to the shape shown in FIG. 1 and may be formed to surround each body part of the user U.

The seating surface 21 of the seat frame 20 may be provided to be in contact with the body of the user U. For example, the seating surface 21 of the seat frame 20 may be in contact with the rear surface of the user U to support the user U on the rear side.

The seating surface 21 of the seat frame 20 may include a soft material to enhance the seating comfort of the user U. For example, the seating surface 21 of the seat frame 20 may include leather or cloth material. Accordingly, the seating surface 21 may provide psychological stability to the user U.

In addition, the seating surface 21 of the seat frame 20 may include a deformable material such that the rear surface of the body of the user U may be pressed by a massage module (100 in FIG. 2) on the rear side of the seat frame 20. However, the material forming the seating surface 21 is not limited thereto and may be variously provided as long as it can provide comfort to the user U. Details of the massage module 100 will be described below.

The seating surface 21 may include a first seating portion 211, a second seating portion 212, and a third seating portion 213.

In the following description, the upper body and the lower body of the user U may be distinguished based on the buttocks of the user U.

The first seating portion 211 may be provided to support a part or entirety of the user’s head among the body parts of the user U.

The second seating portion 212 may be connected to the first seating portion 211 and positioned on a lower side of the first seating portion 211. The second seating portion 212 may be provided to support a part or entirety of the user’s upper body among the body parts of the user U. In addition, the second seating portion 212 may be provided to support a rear part of the user’s buttocks among lower body parts of the user U.

The third seating portion 213 may be connected to the second seating portion 212 and positioned on a lower side of the second seating portion 212. The third seating portion 213 may be provided to support a part or entirety of the user's lower body among the body parts of the user U.

For example, the first seating portion 211 and the second seating portion 212 may support a part or entirety of the upper body of the user U including the user's head on the rear side of the user U. The third seating portion 213 may support a part or entirety of the lower body of the user U on the rear side of the user U.

The first seating portion 211 and the second seating portion 212 may be integrally formed with each other. However, it is not limited thereto, and the first seating portion 211 and the second seating portion 212 may be provided in separate parts. For example, the first seating portion 211 may be movably provided with respect to the second seating portion 212 such that the angle at which the first seating portion 211 supports the user U's head is adjusted.

However, it is not limited thereto, and the first seating portion 211 may be connected to the second seating portion 212 so as to be fixed to the second seating portion 212.

The second seating portion 212 may be movably provided with respect to the third seating portion 213 such that the angle at which the second seating portion 212 supports the user U's upper body is adjusted. For example, the second seating portion 212 may be provided so as to rotate forward and backward with respect to the third seating portion 213 based on a point at which the second seating portion 212 is connected to the third seating portion 213.

However, it is not limited thereto, and the second seating portion 212 may be connected to the third seating portion 213 so as to be fixed to the third seating portion 213.

The third seating portion 213 may be provided to support the thighs and calves of the user U on the rear side of the user U. The third seating portion 213 may be divided into a portion supporting the thighs of the user U and a portion supporting the calves of the user U.

The portion supporting the thighs of the user U in the third seating portion 213 may be formed to be inclined backward.

The portion supporting the calves of the user U in the third seating portion 213 may be provided to be pivotable with respect to the portion supporting the thighs of the user U such that the angle of supporting the calves of the user U may be adjusted.

In addition, although not shown in the drawings, the portion supporting the calves of the user U in the third seating portion 213 may be provided in a shape surrounding the calves of the user U such that the calves of the user U may be accommodated therein.

The base frame 10 may include a support body 12, a support leg 11, and a rear cover 13.

The support body 12 may be coupled to the rear side of the seat frame 20 to support the rear surface of the seat frame 20. The support body 12 may be coupled to the seat frame 20 to support a portion of the edge of the seat frame 20.

The rear cover 13 may be disposed on the rear side of the support body 12 to form a part of the rear exterior of the massage apparatus 1. The massage module 100 may be disposed between the rear cover 13 and the seat frame 20.

The support leg 11 may extend downward from the support body 12 and may be supported on an installation surface. The installation surface may refer to a surface forming the floor of a place in which the massage apparatus 1 is placed.

The support body 12 may be rotatably coupled to the support leg 11. Therefore, the support body 12 may be adjusted in angle together with the seat frame 20.

The seat frame 20 and the base frame 10 shown in FIG. 1 are merely one example of the disclosure, and the seat frame 20 and the base frame 10 may be provided in various shapes that support the body of the user U.

Although not shown in the drawing, the seat frame 20 may include an armrest for supporting the arms of the user U.

Although not shown in the drawings, a housing covering the base frame 10 may be provided on the outside of the base frame 10. In addition, the housing may be provided to cover the outside of the seat frame 20. The housing may be provided to cover the upper, lower, left, and right sides of the user U in a state in which the user U is seated on the seat frame 20.

However, it is not limited thereto, and the housing may be provided in various shapes to form the appearance of the massage apparatus 1 while improving the overall aesthetics.

In addition, the housing may be provided to cover at least a portion of the upper, lower, left, and right sides of the user U such that the user U using the massage apparatus 1 feels isolated from the external environment.

In addition, a manipulator M for inputting a command of the user U may be formed on one surface of the housing. The user U may input a command to the massage apparatus 1 through the manipulator M, and the command input through the manipulator M may be received by a controller C of the massage apparatus 1 such that various massage modes may be performed.

However, the input method of the manipulator M is not limited thereto, and the command of the user U may be received by the controller C through remote control of a wireless communication method.

Figure 2:
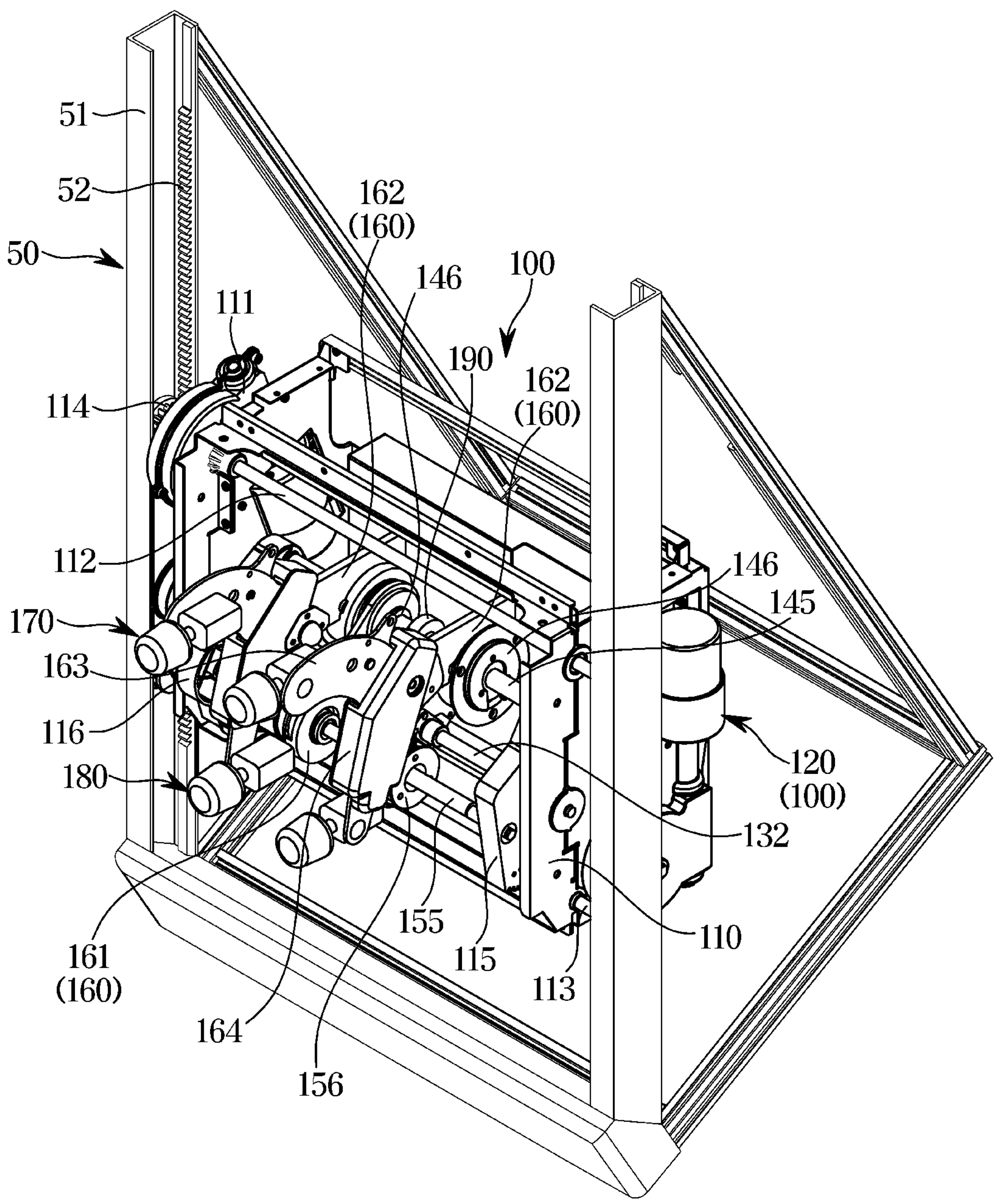
FIG. 2 is a perspective view illustrating a massage module and a guide rail built into a massage apparatus according to an embodiment of the disclosure.

FIG. 2 is a perspective view illustrating a massage module and a guide rail built into a massage apparatus according to an embodiment of the disclosure.

Referring to FIG. 2, the massage apparatus 1 may include a massage module 100 and a guide rail 50. The massage module 100 may include a module base 110 moving along the guide rail 50.

The guide rail 50 may be disposed between the base frame 10 and the seat frame 20 of the massage apparatus 1. The guide rail 50 may be coupled to the base frame 10. However, the guide rail 50 is not limited thereto and may be coupled to the seat frame 20. The guide rail 50 is not limited to a specific mounting position as long as it is fixed in position on the rear side of the seating surface 21.

The massage module 100 may be disposed on the rear side of the seating surface 21 to be movable between the base frame 10 and the seat frame 20. The massage module 100 may move along the guide rail 50.

The guide rail 50 may include a guide body 51 and a guide rack gear 52.

The guide body 51 may be fixed to the inside of the massage apparatus 1 to support the guide rail 50. The guide rack gear 52 may be formed on the inner surface of the guide body 51. The guide rack gear 52 may be provided to include a plurality of teeth portions.

In FIG. 2, the guide rail 50 is illustrated in a frame shape with each side surface forming a triangle and a lower surface forming a quadrangle, but the shape of the guide rail 50 is not limited thereto.

The module base 110 of the massage module 100 may be coupled to the guide rail 50 to be movable with respect to the guide rail 50.

The module base 110 may include a guide pinion gear 114 disposed on the outside of the module base 110.

The guide pinion gear 114 may be provided in plural such that opposite sides of the module base 110 are supported by the guide rail 50. The guide pinion gear 114 may be provided to be engaged with the guide rack gear 52 of the guide rail 50.

Specifically, the guide pinion gear 114 may be accommodated on the inside of the guide body 51 to be movable up and down inside the guide body 51.

The guide pinion gear 114 may be provided to include a plurality of teeth portions to correspond in shape to the guide rack gear 52.

The module base 110 may include a guide shaft that is connected to the guide pinion gear 114 and passes through the module base 110.

The guide shaft may be provided in plural. The guide shaft may include a first guide shaft 112 supporting an upper portion of the module base 110 and a second guide shaft 113 disposed on a lower side of the first guide shaft 112 and supporting a lower portion of the module base 110.

Each end portion of the guide shaft may be coupled to the guide pinion gear 114. The guide shaft may be provided in a bar shape elongated along the left and right directions of the massage apparatus 1.

A guide driver 111 may be mounted on a side surface of the module base 110. The guide driver 111 may provide power to the guide pinion gear 114. The guide driver 111 may rotate the guide pinion gear 114.

As the guide driver 111 rotates the guide pinion gear 114, the guide pinion gear 114 may move up and down along the guide rack gear 52. That is, the module base 110 may move up and down along the guide rail 50. The massage module 100 may move up and down along the guide rail 50.

As the massage module 100 moves up and down along the guide rail 50, the massage module 100 may provide a massage to the entire rear surface of the body of the user U.

The description of the guide rail 50 and the method of driving the massage module guided in movement by the guide rail 50 may be not limited to that shown in FIG. 2. For example, the massage module 100 may move up and down in connection with a separate pulley that transmits power from a driver, other than a rack and pinion method.

Figure 3:
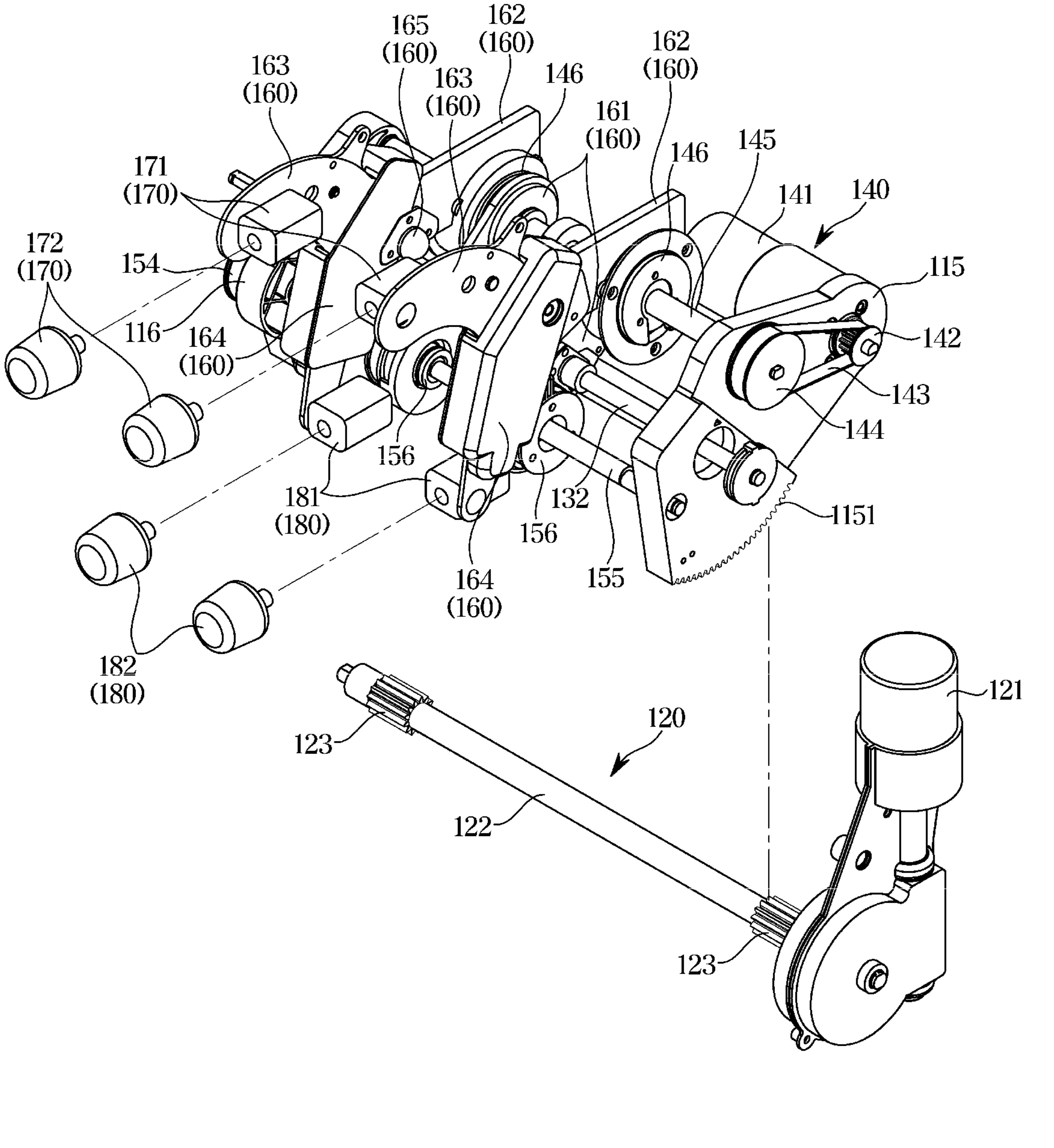
FIG. 3 is a view illustrating main parts of the massage module shown in FIG. 2 according to an embodiment of the disclosure.
Figure 4:
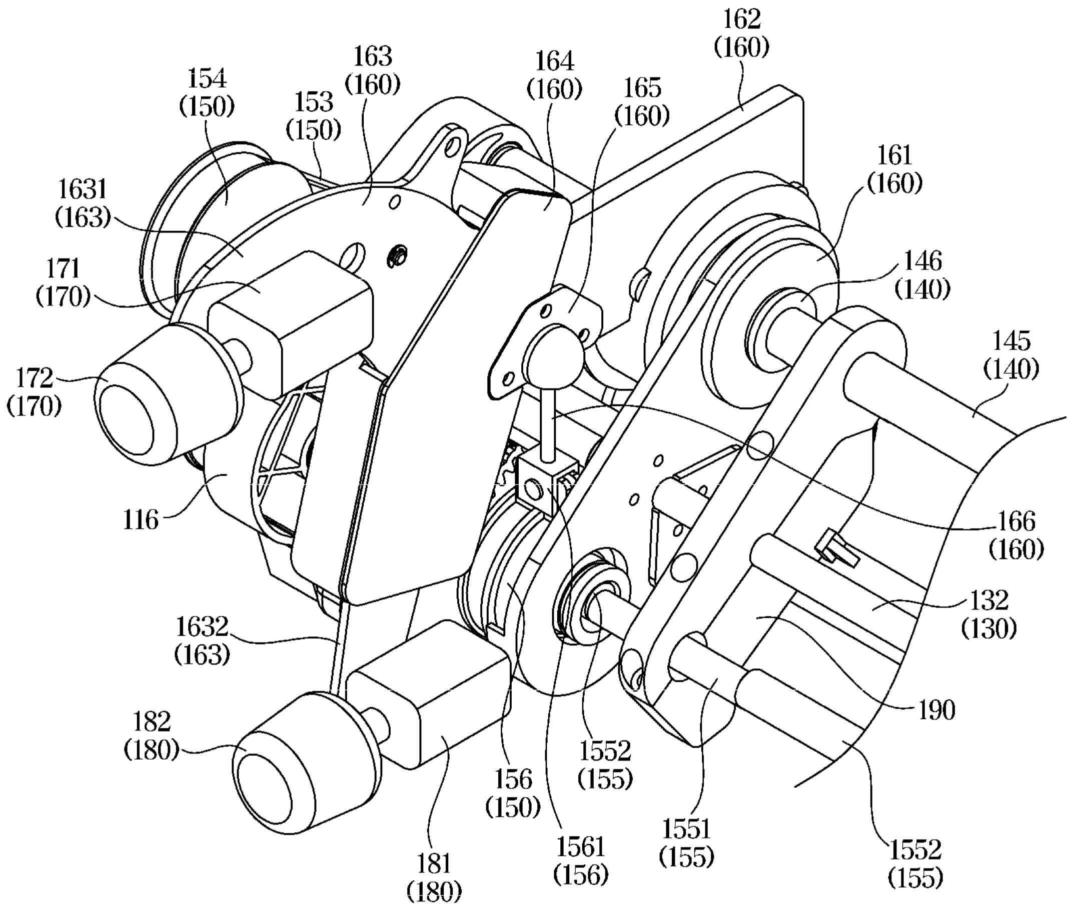
FIG. 4 is a sectioned perspective view of the massage module shown in FIG. 3, which is cut to illustrate the interior, according to an embodiment of the disclosure.

FIG. 3 is a view illustrating main parts of the massage module shown in FIG. 2. FIG. 4 is a sectioned perspective view of the massage module shown in FIG. 3, which is cut to illustrate the interior.

In FIGS. 3 and 4, for the sake of convenience of description, the configuration of the guide rail 50 and the module base 110 in the massage module shown in FIG. 2 is omitted. Hereinafter, configurations related to performing various massage modes of the massage module 100 will be described.

Referring to FIGS. 2 to 4, the massage module 100 may include a side frame rotatably coupled to the module base 110. For example, the side frame may be coupled to be rotatable in forward and backward directions with respect to the module base 110.

The side frame may include a first side frame 115 and a second side frame 116.

The first side frame 115 may be disposed on one side of the massage module 100. For example, the first side frame 115 may be disposed on the left side of the massage module 100 and provided to be rotatable in the forward and backward directions with respect to the module base 110.

The second side frame 116 may be disposed on the other side opposite to the one side of the massage module 100. For example, the second side frame 116 may be disposed on the right side of the massage module 100 and provided to be rotatable in the forward and backward directions with respect to the module base 110.

The first side frame 115 may include a first teeth portion 1151. The first teeth portion 1151 may be provided to be engaged with a pinion gear 123 of a rotational driver 120 to be described below. The first teeth portion 1151 may be formed on a lower end of the first side frame 115.

Figure 6:
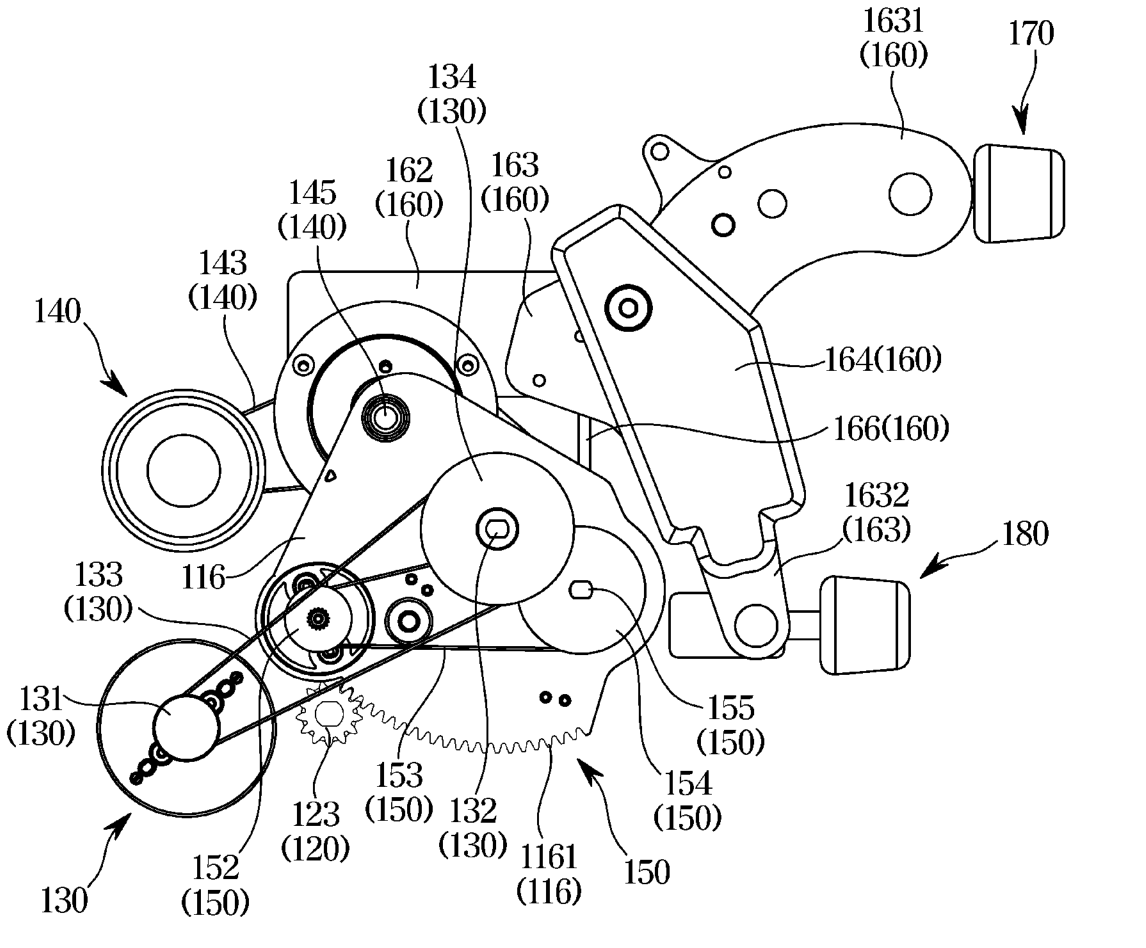
FIG. 6 is a side view of the massage module shown in FIG. 3 when viewed from the right side according to an embodiment of the disclosure.

The second side frame 116 may include a second teeth portion (1161 in FIG. 6). The second teeth portion 1161 may be provided to engage with a pinion gear 123 of the rotational driver 120 to be described below. The second teeth portion 1161 may be formed on a lower end of the second side frame 116.

The massage module 100 may include the rotational driver 120.

The rotational driver 120 may provide rotational power to the side frame. For example, the rotational driver 120 may provide power for the first side frame 115 to rotate in the forward and backward directions with respect to the module base 110. The rotational driver 120 may provide power for the second side frame 116 to rotate in the forward and backward directions with respect to the module base 110.

The rotational driver 120 may simultaneously rotate the first side frame 115 and the second side frame 116.

The rotational driver 120 may include a rotation motor 121 that generates power and a module rotation shaft 122 that rotates by receiving power from the rotation motor 121.

Power generated from the rotation motor 121 may be transmitted to the module rotation shaft 122 through various transmission gears (not shown).

The module rotation shaft 122 may be provided in a bar shape extending lengthwise along the left and right directions of the massage module 100. The module rotation shaft 122 may have a cross section in a circular shape.

The rotational driver 120 may include the pinion gear 123.

The pinion gear 123 may be provided in plural and coupled to the module rotation shaft 122. For example, the pinion gear 123 may be provided as two pinion gears to correspond in number to the side frames, i.e., the first side frame 115 and the second side frame 116.

The pinion gear 123 may be disposed below the first side frame 115 to be engaged with the first teeth portion 1151 of the first side frame 115. The pinion gear 123 may be disposed below the second side frame 116 to be engaged with the second teeth portion 1161 of the second side frame 116.

As the module rotation shaft 122 receives power from the rotation motor 121 and rotates, the pinion gears 123 at the opposite end portions of the module rotation shaft 122 may also rotate together with the module rotation shaft 122.

As the pinion gear 123 rotates, the first side frame 115 may be rotated in the forward and backward directions with respect to the module base 110 by the first teeth portion 1151 engaged with the pinion gear 123. As the pinion gear 123 rotates, the second side frame 116 may be rotated in the forward and backward directions with respect to the module base 110 by the second teeth portion 1161 engaged with the pinion gear 123.

The first side frame 115 and the second side frame 116 may rotate about a module moving shaft 132. In other words, when the first side frame 115 and the second side frame 116 rotate with respect to the module base 110, the position of the module moving shaft 132 may not change. Details thereof will be described below.

The massage module 100 may include a first driver 140.

The first driver 140 may include a first driving motor 141, a first power transmission gear 142, a first pulley 143, and a first shaft coupling gear 144.

The first driving motor 141 may generate power to rotate a first driving shaft 145. The first driving motor 141 may transmit power to the first power transmission gear 142. The first power transmission gear 142 may be disposed on the outside of the first side frame 115 and rotate.

The first pulley 143 may be provided to transmit power transmitted to the first power transmission gear 142 to the first shaft coupling gear 144. The first pulley 143 may be disposed on the outside of the first side frame 115. The first pulley 143 may be provided to connect the first power transmission gear 142 and the first shaft coupling gear 144.

The first shaft coupling gear 144 may be connected to the first pulley 143 to receive power from the first power transmission gear 142. The first shaft coupling gear 144 may rotate using the transmitted power. The first shaft coupling gear 144 may be disposed on the outside of the first side frame 115 and rotate.

The first driver 140 may include the first driving shaft 145.

The first driving shaft 145 may be coupled to the center of the first shaft coupling gear 144. The first driving shaft 145 may have a portion coupled to the first shaft coupling gear 144 of which a cross-section is different from that of a portion coupled to a first bearing 146 to be described below. The first driving shaft 145 may be provided as an eccentric shaft.

The portion of the first driving shaft 145 coupled to the first bearing 146 may have a cross section of which a rotation center is offset from that of the portion coupled to the first shaft coupling gear 144 of the first driving shaft 145.

The first driving shaft 145 may be provided in a bar shape elongated along the left and right directions of the massage module 100. The first driving shaft 145 may be provided to pass through the first bearing 146 and a bracket unit 160 to be described below, and protrude outward of the second side frame 116 on the opposite side.

The first driver 140 may include the first bearing 146. The first bearing 146 may be provided in a pair such that a massage ball unit on the left side and a massage ball unit on the right side of the massage module 100 may be driven simultaneously.

A portion of the first bearing 146 may be disposed to surround the outside of the first driving shaft 145. A portion of the first bearing 146 may be accommodated inside of a fixing bracket 161 to be described below.

The first bearing 146 may assist rotation of the first driving shaft 145. The portion of the first bearing 146 accommodated inside of the fixing bracket 161 may rotate together with the first driving shaft 145 so as to rotate with respect to the fixing bracket 161.

The first bearing 146 may be disposed to be inclined with respect to the first driving shaft 145. Specifically, the first bearing 146 may cover an outer circumferential surface of the first driving shaft 145 so as to be inclined from the inside to the outside of the massage module 100.

Therefore, a remaining portion of the first bearing 146 surrounding the outside of the first driving shaft 145 may, due to the first bearing 146 being disposed to be inclined, move to the inside or outside of the fixing bracket 161 to adjust the angle of a support bracket 162 to be described below.

That is, as the first driving shaft 145 is provided as an eccentric shaft, and the first bearing 146 is disposed to be inclined with respect to the first driving shaft 145, the angle of the support bracket 162 of the bracket unit 160 may be varied by driving the first driving motor 141.

As the angle of the support bracket 162 is varied, an area to press the rear surface of the body of the user U by a first massage ball unit 170 and a second massage ball unit 180 mounted on a connecting bracket 163 connected to the support bracket 162 may be adjusted.

Therefore, the first driver 140 of the massage apparatus 1 may be controlled by the controller C to adjust the massage area.

The massage module 100 may include a second driver 150.

The second driver 150 may include a second driving shaft 155. The second driving shaft 155 may rotate together with rotation of a second shaft coupling gear 154. The second driving shaft 155 may be connected to a second bearing 156.

The second driving shaft 155 may be disposed to pass through the first side frame 115 and the second side frame 116. The second driving shaft 155 may rotate inside of the first side frame 115 and the second side frame 116.

The second bearing 156 may assist rotation of the second driving shaft 155. The second bearing 156 is provided in a pair such that the massage ball unit on the left side and the massage ball unit on the right side of the massage module 100 may be driven simultaneously.

A portion of the second bearing 156 may be disposed to surround the outside of the second driving shaft 155. A portion of the second bearing 156 may be accommodated inside of a fixing bracket 161 to be described below.

The portion of the second bearing 156 accommodated inside of the fixing bracket 161 may rotate together with the second driving shaft 155 so as to rotate with respect to the fixing bracket 161. A remaining portion of the second bearing 156 surrounding the outside of the second driving shaft 155 may be provided not to rotate.

The second driving shaft 155 may include a first shaft portion 1551 and a second shaft portion 1552. The first shaft portion 1551 may have a radius smaller than that of the second shaft portion 1552. The second shaft portion 1552 may be connected to the first shaft portion 1551 to be eccentric with respect to the first shaft portion 1551. In other words, the centers of the second shaft portion 1552 and the first shaft portion 1551 may not be disposed on the same reference line.

Accordingly, since the second driving shaft 155 is rotated in an eccentric state, the second bearing 156 may be moved up and down by the second driving shaft 155.

A bearing fixing portion 1561 may be formed on the upper side of the second bearing 156. The bearing fixing portion 1561 may be connected to a bracket unit 160 to be described below. Accordingly, the vertical motion of the second bearing 156 may be transmitted to the bracket unit 160. Details thereof will be described below.

The massage module 100 may include a translational driver 130.

The translational driver 130 may include a module moving shaft 132. The module moving shaft 132 may be disposed to pass through the fixing bracket 161 to be described below.

A screw thread may be formed on an outer circumferential surface of the module moving shaft 132. A screw thread may also be formed on an inner circumferential surface of the fixing bracket 161 that is in contact with the outer circumferential surface of the module moving shaft 132.

Therefore, as a moving motor (131 in FIG. 6) rotates the module moving shaft 132, the fixing bracket 161 may move horizontally along the module moving shaft 132 inward or outward of the massage module 100. In addition, based on the rotation of the module moving shaft 132, the support bracket 162 connected to the fixing bracket 161 and the connecting bracket 163 connected to the support bracket 162 also may horizontally move inward or outward of the massage module 100 along the moving shaft 132.

In addition, based on the rotation of the module moving shaft 132, the first massage ball unit 170 and the second massage ball unit 180 connected to the connecting bracket 163 may also be moved horizontally.

Therefore, since the translational driver 130 of the massage apparatus 1 may be provided to move the massage ball unit leftward and rightward, the same massage effect may be implemented regardless of the body size of the user U.

Details of the translational driver 130 will be described below.

The massage module 100 may include a bracket unit 160.

Components included in the bracket unit 160 to be described below may each be provided in a pair. However, it is not limited thereto, and components included in the bracket unit 160 may be provided singly. In this case, the first bearing 146 and the second bearing 156 may also be provided singly. In addition, the massage ball unit connected to the bracket unit 160 may also be provided singly.

The bracket unit 160 may be provided to be movable in connection to the first driving shaft 145 and the second driving shaft 155.

The bracket unit 160 may include the fixing bracket 161.

The fixing bracket 161 may be provided to allow the first driving shaft 145 and the second driving shaft 155 to pass therethrough. The fixing bracket 161 may be provided to allow the module moving shaft 132 to pass therethrough. Specifically, the module moving shaft 132 may be provided to pass through the fixing bracket 161 between the first driving shaft 145 and the second driving shaft 155.

The fixing bracket 161 may be provided to be fixed in position with respect to the first side frame 115 and the second side frame 116. The fixing bracket 161 may be provided to only move left and right with respect to the module moving shaft 132 without changing the relative position with respect to the first side frame 115 and the second side frame 116. The fixing bracket 161 may be provided to allow a portion of the first bearing 146 and a portion of the second bearing 156 to be inserted thereinto and supported.

The bracket unit 160 may include the support bracket 162.

The support bracket 162 may be provided to be movable with respect to the fixing bracket 161. The support bracket 162 may be connected to the first bearing 146. The support bracket 162 may interfere with the first bearing 146 and vary in position. The support bracket 162 may be provided to surround the outer circumferential surface of the first bearing 146 and extend forward.

The support bracket 162 may be connected to the first driving shaft 145 by the first bearing 146. As the first driving shaft 145 rotates, the first bearing 146 disposed to be inclined with respect to the first driving shaft 145 may move.

Specifically, the first bearing 146 may be provided to vary in angle between a state in which the upper portion thereof is disposed to be inclined toward the inside of the massage module 100 and a state in which the upper portion thereof is disposed to be inclined toward the outside of the massage module 100.

Such a movement of the first bearing 146 may allow the support bracket 162 also to move inward or outward of the massage module 100 with an angle variation.

The bracket unit 160 may include a connecting bracket 163, a bracket cover 164, a bracket fixing member 165, and a connecting member 166.

The connecting bracket 163 may be connected to the support bracket 162. The connecting bracket 163 may include an upper mounting portion 1631 and a lower mounting portion 1632. The upper mounting portion 1631 may extend upward and forward from a body of the connecting bracket 163, and the lower mounting portion 1632 may extend downward from the body of the connecting bracket 163.

The bracket cover 164 may be disposed to cover a portion in which the upper mounting portion 1631 and the lower mounting portion 1632 of the connecting bracket 163 are connected to each other. The bracket cover 164 may be provided to reinforce the strength of the connecting bracket 163.

The bracket fixing member 165 may be provided to fix the relative positions of the connecting bracket 163, the bracket cover 164, and the support bracket 162. The bracket fixing member 165 may be connected to the connecting bracket 163, the bracket cover 164, and the support bracket 162.

The bracket fixing member 165 may be connected to the bearing fixing portion 1561 of the second bearing 156 through the connecting member 166. Therefore, when the second bearing 156 reciprocates up and down based on the rotation of the second driving shaft 155, the reciprocating motion of the second bearing 156 may be transferred to the bracket unit 160 through the connecting member 166.

In other words, based on the eccentric rotation of the second driving shaft 155, the connecting bracket 163 may be provided to be movable with respect to the fixing bracket 161. The connecting bracket 163 may be provided to move up and down with respect to the fixing bracket 161.

Therefore, the first massage ball unit 170 and the second massage ball unit 180 connected to the end portions of the connecting bracket 163 may reciprocate up and down, so that a massage operation of the massage apparatus 1 may be implemented.

In addition, the connecting member 166 may be coupled to the bearing fixing portion 1561 of the second bearing 156 so as to be pivotable left and right with respect to the bearing fixing portion 1561. Therefore, when the first bearing 146 is inclined to the outside of the massage module 100 and the support bracket 162 moves to the outside of the massage module 100 together with the first bearing 146 as described above, the connecting member 166 may also pivot about the bearing fixing portion 1561 towards the outside of the massage module 100.

The massage module 100 may include a frame connecting member 190.

The frame connecting member 190 may be provided to be connected to the first side frame 115 and the second side frame 116. The frame connecting member 190 may be provided such that the first driving shaft 145, the second driving shaft 155, and the module moving shaft 132 pass therethrough. The frame connecting member may be disposed between a pair of bracket units 160.

The frame connecting member 190 may be provided to assist the bracket unit 160, the first driver 140, and the second driver 150 with moving as one body when the first side frame 115 and the second side frame 116 rotate in the forward and backward directions with respect to the module base 110.

The massage module 100 may include massage ball units 170 and 180.

The massage ball unit 170 or 180 may be coupled to the bracket unit 160 so as to advance and retreat with respect to the bracket unit 160. Movement of the massage ball units may be controlled by an electromagnet.

The massage ball unit 170 or 180 may be provided as a pair to correspond to the bracket unit 160.

The massage ball units 170 and 180 may include a first massage ball unit 170 and a second massage ball unit 180.

The first massage ball unit 170 may be mounted on the upper mounting portion 1631 of the connecting bracket 163. The second massage ball unit 180 may be mounted on the lower mounting portion 1632 of the connecting bracket 163.

The first massage ball unit 170 may include a first case 171 and a first massage ball 172.

The first case 171 may be mounted on the connecting bracket 163. Specifically, the first case 171 may be mounted on the upper mounting portion 1631 of the connecting bracket 163.

The first case 171 may include a coil portion therein. The controller C may control the amount of current supplied to the coil portion of the first case 171. The first massage ball 172 may be provided to advance and retreat with respect to the first case 171 by a magnetic field induced from the coil portion.

The second massage ball unit 180 may include a second case 181 and a second massage ball 182.

The second case 181 may be mounted on the connecting bracket 163. Specifically, the second case 181 may be mounted on the lower mounting portion 1632 of the connecting bracket 163.

The second case 181 may include a coil portion therein. The controller C may control the amount of current supplied to the coil portion of the second case 181. The second massage ball 182 may be provided to advance and retreat with respect to the second case 181 by a magnetic field induced from the coil portion.

Figure 5:
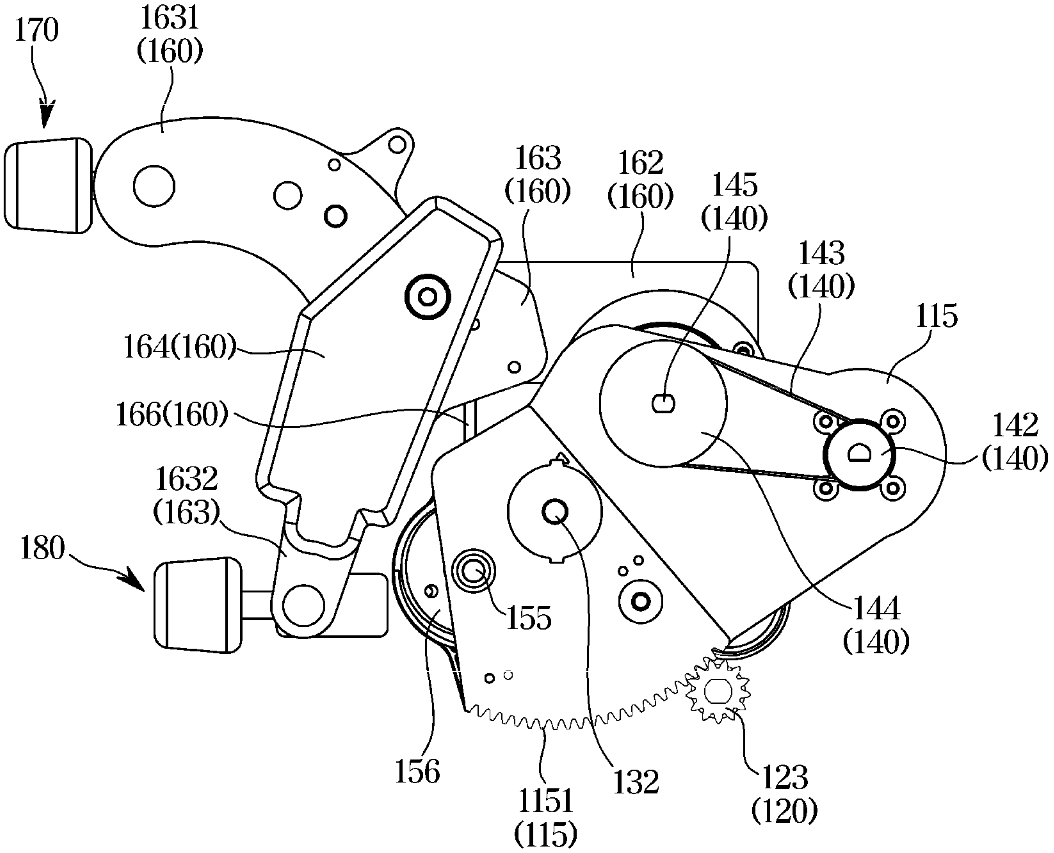
FIG. 5 is a side view of the massage module shown in FIG. 3 when viewed from the left side according to an embodiment of the disclosure.

FIG. 5 is a side view of the massage module shown in FIG. 3 when viewed from the left side. FIG. 6 is a side view of the massage module shown in FIG. 3 when viewed from the right side.

Referring to FIG. 5, the first driver 140 may be provided on a side surface of the first side frame 115.

The first driving motor 141 of the first driver 140 may transmit power to the first power transmission gear 142. The first power transmission gear 142 may transmit power to the first shaft coupling gear 144 through the first pulley 143.

The first driving shaft 145 may be inserted into the center of the first shaft coupling gear 144 to rotate together with the first shaft coupling gear 144. By the driving of the first driver 140, the first bearing 146 may be moved, and the support bracket 162 connected to the first bearing 146 may vary in angle toward inside or outside of the massage module 100.

Therefore, the bracket unit 160 may vary in angle through the driving of the first driver 140, and the massage ball unit connected to the bracket unit 160 may vary in angle. By the driving of the first driver 140, the massage area may be adjusted.

The first teeth portion 1151 formed on the lower end of the first side frame 115 may be disposed to be engaged with the pinion gear 123 of the rotational driver 120.

Accordingly, through the driving of the rotational driver 120, the first side frame 115 may be rotated in the forward and backward directions of the massage module 100. In this case, the first side frame 115 may rotate about the module moving shaft 132 of the translational driver 130.

Referring to FIG. 6, the second driver 150 and the translational driver 130 may be provided on the side surface of the second side frame 116.

The second driving motor of the second driver 150 may transmit power to the second power transmission gear 152. The second power transmission gear 152 may transmit power to the second shaft coupling gear 154 through the second pulley 153.

The second driving shaft 155 may be inserted into the center of the second shaft coupling gear 154 and rotate together with the second shaft coupling gear 154. By the driving of the second driver 150, the second driving shaft 155 provided as an eccentric shaft may be rotated, and the eccentric rotation of the second driving shaft 155 may cause the connecting member 166 connected to the second bearing 156 to move up and down.

Accordingly, the connecting bracket 163 connected to the connecting member 166 may move up and down. In addition, the first massage ball unit 170 and the second massage ball unit 180 connected to the connecting bracket 163 may also move up and down.

Accordingly, through the driving of the second driver 150, the bracket unit 160 may reciprocate up and down.

The movement motor 131 of the translational driver 130 may transmit power to a moving shaft coupling gear 134 through a transfer pulley 133. The module moving shaft 132 may be coupled to the center of the moving shaft coupling gear 134.

As described above, the module moving shaft 132 may be provided with a screw thread on the outer circumferential surface thereof to thereby move the fixing bracket 161 in the left and right directions. As the fixing bracket 161 moves in the left and right directions, the support bracket 162, the connecting bracket 163, the first massage ball unit 170, and the second massage ball unit 180 connected to the fixing bracket 161 may also move in the left and right directions.

Accordingly, the bracket unit 160 and the massage ball unit may be moved in the left and right directions through the driving of the translational driver 130.

The second teeth portion 1161 formed on the lower end of the second side frame 116 may be disposed to be engaged with the pinion gear 123 of the rotational driver 120.

Accordingly, through the driving of the rotational driver 120, the second side frame 116 may be rotated in the forward and backward directions of the massage module 100. In this case, the second side frame 116 may rotate about the module moving shaft 132 of the translational driver 130. The second side frame 116 may rotate together with the first side frame 115.

Figure 7:
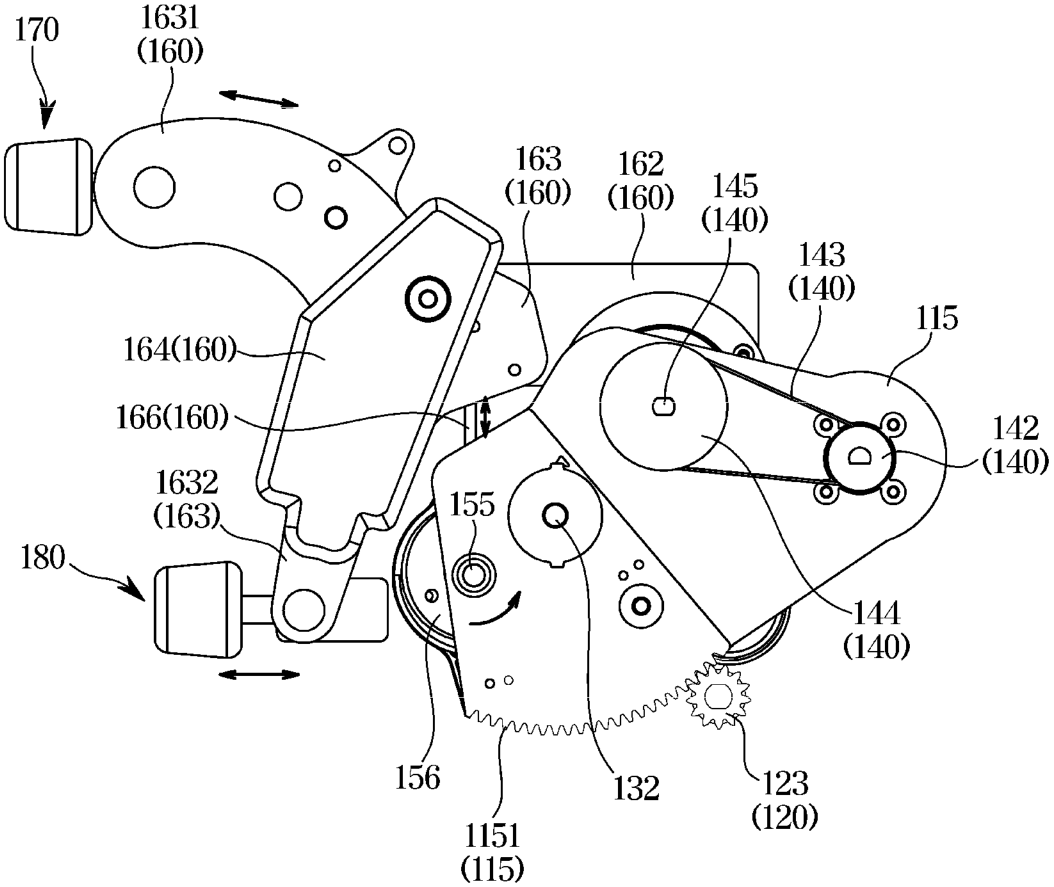
FIG. 7 is a view illustrating an operation when a general massage mode is performed in a massage apparatus according to an embodiment of the disclosure.

FIG. 7 is a view illustrating an operation when a general massage mode is performed in a massage apparatus according to an embodiment of the present disclosure.

The controller C may drive the second driving motor of the second driver 150. The power of the second driving motor may be transmitted to the second power transmission gear 152, and the second power transmission gear 152 may transmit the power to the second shaft coupling gear 154 through the second pulley 153 and thus the second driving shaft 155 may be rotated.

By an eccentric rotation of the second driving shaft 155, the second bearing 156 connected to the second driving shaft 155 may reciprocate up and down. In addition, the connecting member 166 of the bracket unit 160 connected to the second bearing 156 may reciprocate up and down. Accordingly, the connecting bracket 163 connected to the connecting member 166 reciprocates and thus the rear surface of the user's body may be massaged by the first massage ball unit

170 and the second massage ball unit 180 connected to the end portions of the connecting bracket 163.

In such a general massage mode, the first massage ball unit 170 and the second massage ball unit 180 may not be controlled in movement by the electromagnet and remain immovable with respect to the connecting bracket 163.

Figure 8:
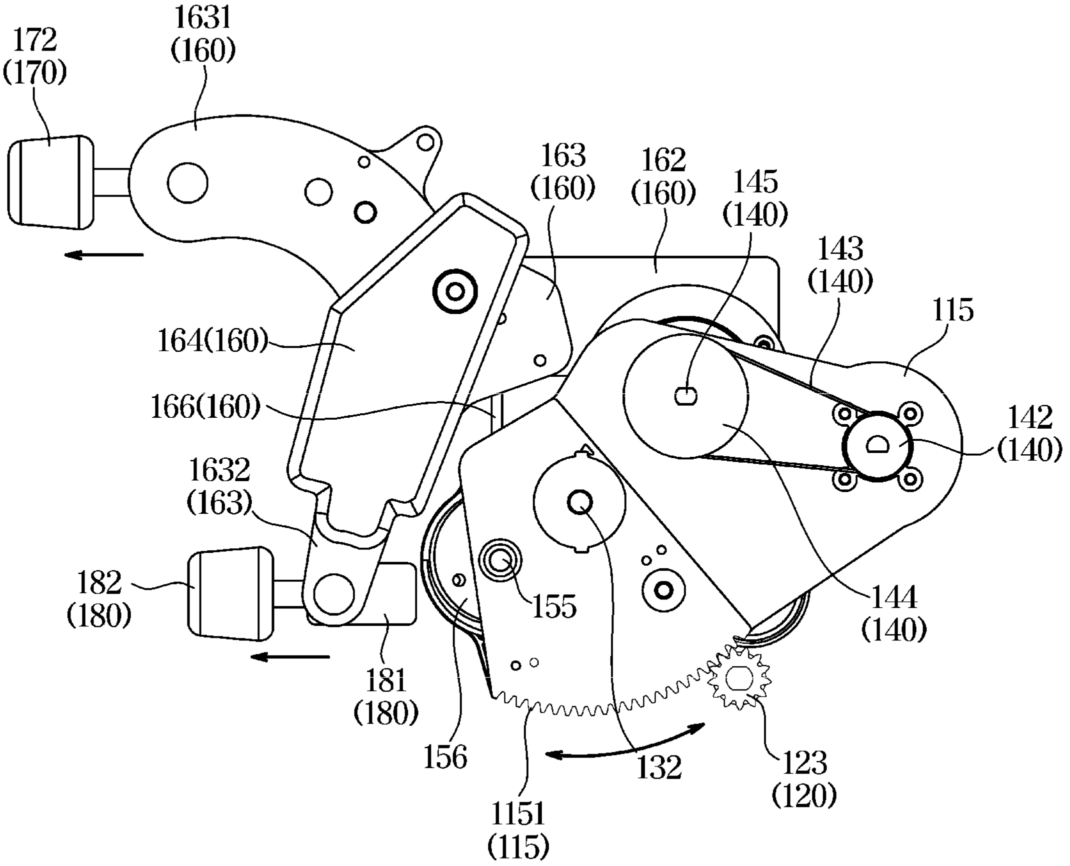
FIGS. 8 and 9 are views illustrating operations when a low-noise massage mode is performed in a massage apparatus according to an embodiment of the disclosure.
Figure 9:
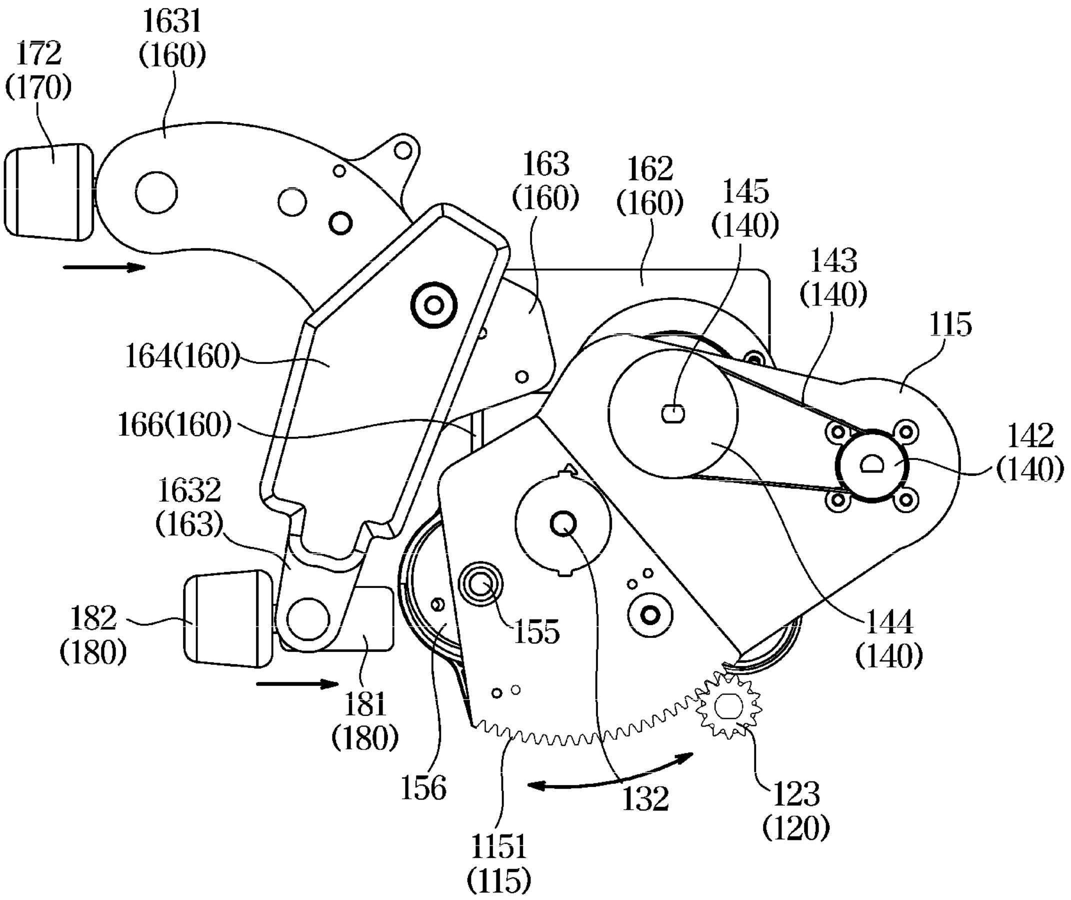

FIGS. 8 and 9 are views illustrating operations when a low-noise massage mode is performed in a massage apparatus according to an embodiment of the present disclosure.

Referring to FIGS. 8 to 9, the controller C may control the amount of current supplied to the electromagnet of the massage ball unit.

In the low-noise massage mode, the controller C may perform control to prevent the first driver 140 and the second driver 150, which provide power for moving the bracket unit 160, from operating.

In this case, the controller C may perform control such that only the first massage ball unit 170 and the second massage ball unit 180 are driven. More specifically, the controller C may control the amounts of current supplied to the first massage ball unit 170 and the second massage ball unit 180.

The controller C may individually control the amounts of current supplied to the first massage ball unit 170 and the second massage ball unit 180 such that the first massage ball unit 170 and the second massage ball unit 180 move at different velocities from each other. The first massage ball unit 170 and the second massage ball unit 180 may be movable forward and backward with respect to the seating surface 21.

The low-noise massage mode may include a low-noise pressing mode, a low-noise tapping mode, and a low-noise vibration mode.

In the low-noise pressing mode, the controller C may control the amounts of current supplied to the first massage ball unit 170 and the second massage ball unit 180 such that the first massage ball unit 170 and the second massage ball unit 180 move at a first velocity.

In this case, the controller C may vary the driving timings of the first massage ball unit 170 and the second massage ball unit 180 such that each of the first massage ball unit 170 and the second massage ball unit 180 advance and retreat at a different timing. For example, when the first massage ball 172 of the first massage ball unit 170 moves forward, the second massage ball 182 of the second massage ball unit 180 may move backward. When the first massage ball 172 of the massage ball unit 170 moves backward, the second massage ball 182 of the second massage ball unit 180 may move forward.

In the low-noise tapping mode, the controller C may control the amounts of current supplied to the first massage ball unit 170 and the second massage ball unit 180 such that the first massage ball unit 170 and the second massage ball unit 180 move at a second velocity higher than the first velocity.

In this case, the controller C may vary the driving timings of the first massage ball unit 170 and the second massage ball unit 180 such that each of the first massage ball unit 170 and the second massage ball unit 180 advance and retreats at a different timing. For example, when the first massage ball 172 of the first massage ball unit 170 moves forward, the second massage ball 182 of the second massage ball unit 180 may move backward. When the first massage ball 172 of the massage ball unit 170 moves backward, the second massage ball 182 of the second massage ball unit 180 may move forward.

In the low-noise vibration mode, the controller C may control the amounts of current supplied to the first massage ball unit 170 and the second massage ball unit 180 such that the first massage ball unit 170 and the second massage ball unit 170 move at a third velocity higher than the second velocity.

In this case, the controller C may control the rotational driver 120 to rotate the first side frame 115 and the second side frame 116 such that the rear surface of the body the user U seated on the seating surface 21 comes in close contact with the first massage ball unit 170 and the second massage ball unit 180. With such a configuration, massage may be provided more efficiently.

Figure 10:
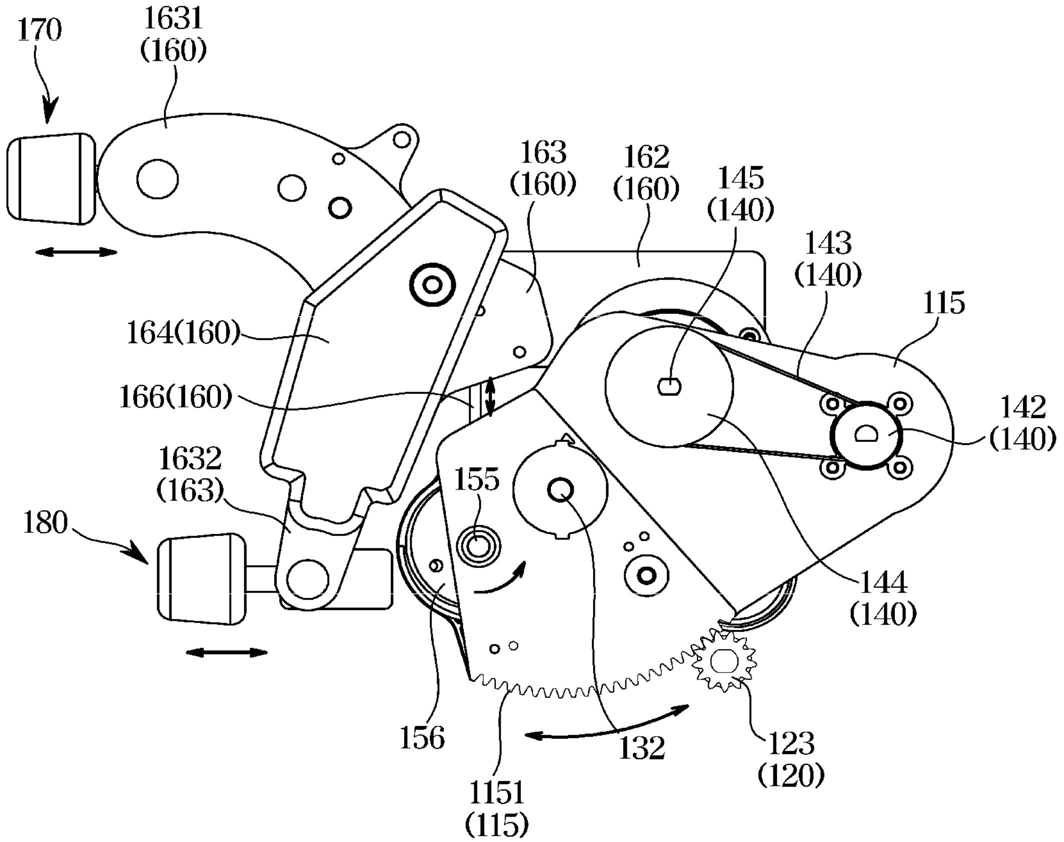
FIG. 10 is a view illustrating an operation when a complex massage mode is performed in a massage apparatus according to an embodiment of the disclosure.

FIG. 10 is a view illustrating an operation when a complex massage mode is performed in a massage apparatus according to an embodiment of the present disclosure.

Referring to FIG. 10, in the complex massage mode, the controller C may control the rotational driver 120 to adjust the angle of the massage module.

The controller C may drive the second driving motor of the second driver 150. The power of the second driving motor may be transmitted to the second power transmission gear 152, and the second power transmission gear 152 may transmit the power to the second shaft coupling gear 154 through the second pulley 153 and thus the second driving shaft 155 may be rotated.

By an eccentric rotation of the second driving shaft 155, the second bearing 156 connected to the second driving shaft 155 may reciprocate up and down. In addition, the connecting member 166 of the bracket unit 160 connected to the second bearing 156 may reciprocate up and down. Accordingly, the connecting bracket 163 connected to the connecting member 166 reciprocates and thus the rear surface of the body of the user U may be massaged by the first massage ball unit 170 and the second massage ball unit 180 connected to the end portions of the connecting bracket 163.

In the complex massage mode, unlike the general massage mode, the first massage ball unit 170 and the second massage ball unit 180 may be controlled in motion by an electromagnet and moved with respect to the connecting bracket 163.

The controller C may individually control the amounts of current supplied to the first massage ball unit 170 and the second massage ball unit 180 such that the first massage ball unit 170 and the second massage ball unit 180 move at different velocities. The first massage ball unit 170 and the second massage ball unit 180 may be movable forward and backward with respect to the seating surface 21.

The massage apparatus 1 according to the disclosure may reduce noise generated from the massage module in providing a massage to the user U, increasing the satisfaction of the user U.

In addition, by using a massage ball unit using an electromagnet, the massage intensity of the massage module may be controlled in subdivided stages. In addition, based on control by an electromagnet, an immediate massage intensity change may be performed.

In addition, through a complex massage mode that combines the drive of the bracket unit with the drive of the massage ball unit, more various massage modes may be provided to the user U.

Although the disclosure has been shown and described in relation to specific embodiments, it would be appreciated by those skilled in the art that changes and modifications may be made in these embodiments without departing from the principles and scope of the invention, the scope of which is defined in the claims and their equivalents.

What is claimed is:

1. A massage apparatus comprising:

a base frame;

a seat frame coupled to the base frame to form a seating surface; and a massage module disposed at a rear of the seating surface to be movable between the base frame and the seat frame, wherein the massage module includes:

a module base, a side frame coupled to the module base to be rotatable in forward and backward directions, a driving shaft disposed to pass through the side frame and rotate inside of the side frame, the driving shaft including a first driving shaft and a second driving shaft, a module moving shaft disposed to pass through the side frame and positioned between the first driving shaft and the second driving shaft, a bracket unit connected to the first driving shaft and the second driving shaft and configured to be movable according to rotation of the first driving shaft and the second driving shaft, and a massage ball unit including an electromagnet and a massage ball, the massage ball unit coupled to the bracket unit to advance and retreat based on movement of the bracket unit, and the massage ball being movable by the electromagnet, wherein the bracket unit includes a fixing bracket fixed in position with respect to the side frame, and configured so that the first driving shaft, the second driving shaft, and the module moving shaft pass through the fixing bracket, the first driving shaft is coupled with a first bearing disposed at an inclination relative to the first driving shaft so as to vary an angle of the bracket unit, the second driving shaft is coupled with a second bearing and is configured to reciprocate the bracket unit in a vertical direction by eccentric rotation, and the module moving shaft is configured to move the fixing bracket and the massage ball unit in a horizontal direction by rotation thereof.

2. The massage apparatus of claim 1, further comprising:

a controller configured to control an amount of current supplied to the electromagnet of the massage ball unit.

3. The massage apparatus of claim 2, wherein the bracket unit includes:

a connecting bracket configured to be movable with respect to the fixing bracket based on an eccentric rotation of the first driving shaft and the second driving shaft; and the massage ball unit includes:

a case mounted on the connecting bracket and including a coil portion forming the electromagnet, the massage ball being configured to advance and retreat with respect to the case by a magnetic field induced from the coil portion.

4. The massage apparatus of claim 3, wherein the connecting bracket includes:

an upper mounting portion, and a lower mounting portion disposed below the upper mounting portion.

5. The massage apparatus of claim 4, wherein the massage ball unit includes:

a first massage ball unit mounted on the upper mounting portion; and a second massage ball unit mounted on the lower mounting portion.

6. The massage apparatus of claim 5, wherein the controller is configured to individually control amounts of current supplied to the first massage ball unit and the second massage ball unit so that the massage ball of the first massage ball unit and the massage ball of the second massage ball unit move at different velocities.

7. The massage apparatus of claim 1, further comprising:

a controller configured to control driving of the massage module; and a driver configured to provide power for moving the bracket unit, wherein the controller controls the massage module so that only the massage ball unit is driven, and prevents the driver from being driven, to perform a low-noise massage mode.

8. The massage apparatus of claim 7, wherein the controller is configured to control an amount of current supplied to the massage ball unit so that the massage ball of the massage ball unit moves at a first velocity, to perform a low-noise pressing mode.

9. The massage apparatus of claim 8, wherein the controller is configured to control the amount of current supplied to the massage ball unit so that the massage ball of the massage ball unit moves at a second velocity that is higher than the first velocity, to perform a low-noise tapping mode.

10. The massage apparatus of claim 9, further comprising:

a rotational driver configured to provide rotational power to the side frame, wherein the controller is configured to control the rotational driver to rotate the side frame so that a rear surface of a body of a user seated on the seating surface is in close contact with the massage ball unit, and control the amount of current supplied to the massage ball unit so that the massage ball of the massage ball unit moves at a third velocity that is higher than the first velocity and the second velocity, to perform a low-noise vibration mode.

11. The massage apparatus of claim 1, wherein the massage ball unit is configured to be movable forward and backward based on the seating surface.

12. The massage apparatus of claim 1, wherein the module base includes:

a guide pinion gear disposed on an outside of the module base, and a guide shaft connected to the guide pinion gear and passing through the module base, and the massage apparatus further comprises:

a guide rail mounted on the base frame and having a guide rack gear engaged with the guide pinion gear to movably support each side of the module base.

* * * * *